(12) United States Patent
Grajek et al.

(10) Patent No.: US 9,742,570 B2
(45) Date of Patent: Aug. 22, 2017

(54) SECURING MULTIMEDIA CONTENT VIA CERTIFICATE-ISSUING CLOUD SERVICE

(71) Applicant: Garret Grajek, Aliso Viejo, CA (US)

(72) Inventors: Garret Grajek, Aliso Viejo, CA (US); Stephen Marshall Moore, Portland, OR (US)

(73) Assignee: Garret Grajek, Aliso Viejo, CA (US)

( * ) Notice: Subject to any disclaimer, the term of this patent is extended or adjusted under 35 U.S.C. 154(b) by 279 days.

(21) Appl. No.: 14/719,686

(22) Filed: May 22, 2015

(65) Prior Publication Data

US 2016/0344561 A1    Nov. 24, 2016

(51) Int. Cl.
*H04L 29/06* (2006.01)
*H04L 9/32* (2006.01)
*G06F 21/31* (2013.01)
*G06F 21/10* (2013.01)

(52) U.S. Cl.
CPC ............ *H04L 9/3268* (2013.01); *G06F 21/10* (2013.01); *G06F 21/31* (2013.01); *H04L 9/3236* (2013.01); *H04L 63/0884* (2013.01)

(58) Field of Classification Search
CPC . H04L 9/3268; H04L 63/0884; H04L 9/3236; G06F 21/10; G06F 21/31
USPC .......................................................... 713/156
See application file for complete search history.

(56) References Cited

U.S. PATENT DOCUMENTS

| 2002/0065912 A1* | 5/2002 | Catchpole | G06F 17/30873 |
| | | | 709/224 |
| 2002/0083178 A1* | 6/2002 | Brothers | G06F 21/10 |
| | | | 709/226 |

* cited by examiner

*Primary Examiner* — Mohammad W Reza
(74) *Attorney, Agent, or Firm* — Schwegman Kundberg & Woessner, P.A.

(57) ABSTRACT

A media server authenticates a user of a client device. The media server retrieves or generates a shared key stored at the media server, encrypts the shared key with a hash based on web session attributes of the client device. The server provides the encrypted private key to the client device after authentication of the user. The media server provides encrypted media content to the client device in response to a request from the client device. The client device decrypts the shared key and decrypts the encrypted media content with the decrypted private key.

20 Claims, 11 Drawing Sheets

SECURING MULTIMEDIA CONTENT VIA CERTIFICATE-ISSUING CLOUD SERVICE

TECHNICAL FIELD

The subject matter disclosed herein generally relates to the processing of data. Specifically, the present disclosure addresses systems and methods to facilitate securing multimedia content via certificate-issuing cloud service.

BACKGROUND

Video and multi-media content are no longer just recreational entities for amusement. Multi-media content is often key data in various industries such as legal, law enforcement, health care and entertainment. This data is typically stored unencrypted in a media storage server that enables viewers to remotely access the media via any browser or viewer on their device. Storing unencrypted data renders the data vulnerable to hackers and offers little or no security feature for enterprise deployment. Furthermore, various tools or desktop applications may be used to copy and distribute the unencrypted data.

BRIEF DESCRIPTION OF THE DRAWINGS

Some embodiments are illustrated by way of example and not limitation in the figures of the accompanying drawings.

DETAILED DESCRIPTION

Figure 1:
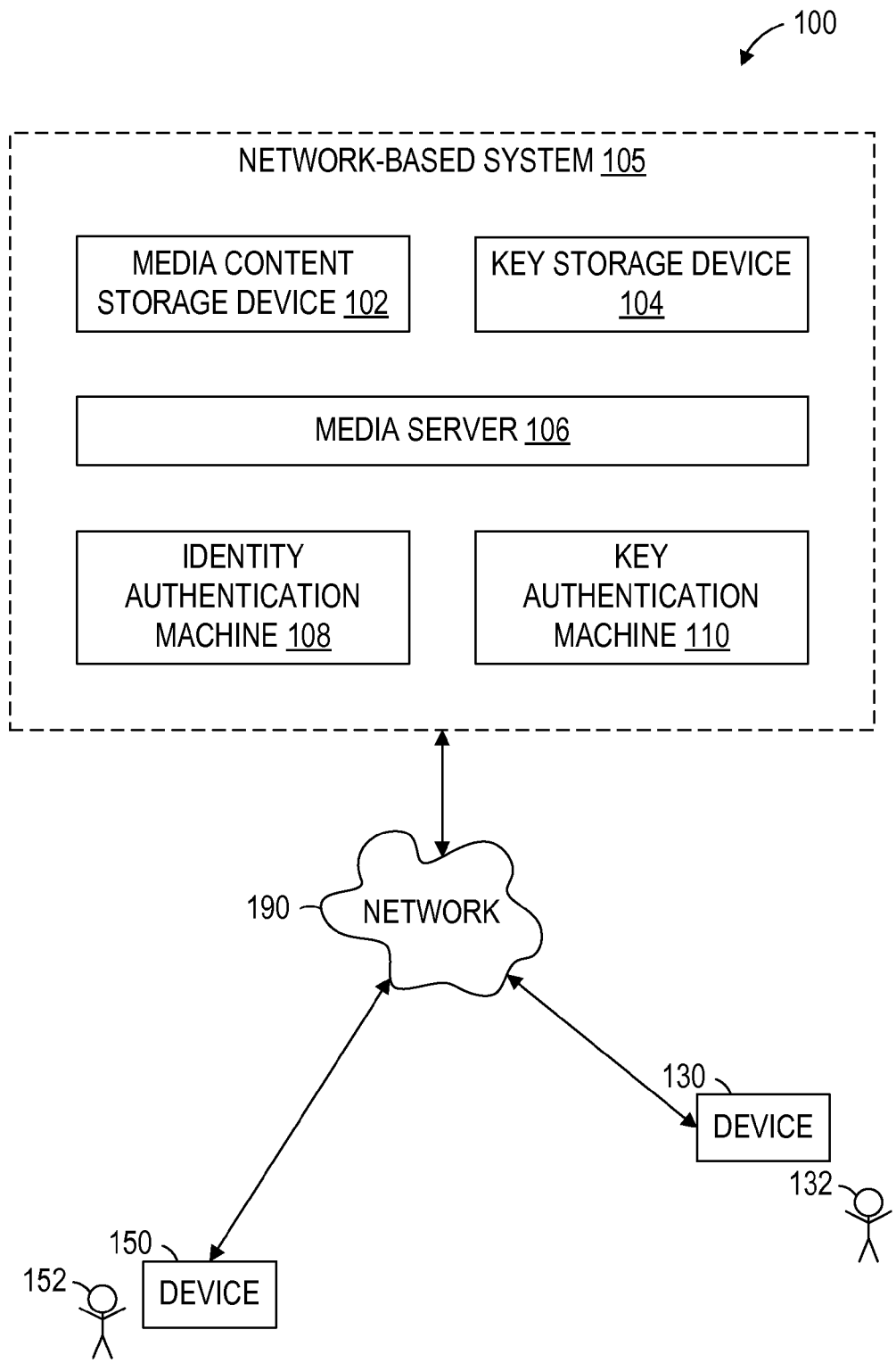
FIG. 1 is a network diagram illustrating a network environment suitable for securing multimedia content via certificate-issuing cloud service, according to some example embodiments.

Example methods and systems are directed to securing multimedia content via certificate-issuing cloud service. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The encryption and access to media content may be managed using a content management server that enables enterprises to upload, manage and view all of their media content (e.g., videos) from a single user interface (e.g., a website). The media content is encrypted and stored at the content management server. Links to the website associated with the media content can be passed to other users (e.g., team members and affiliates of the enterprise). Users who have been granted authorization privileges by the owner of the media content are able to view the media content from their client device. The user interface enables a user to view, upload, and categorize media content files.

The content management server may issue encryption keys (e.g., public and private keys) to encrypt the media content stored at the content management server. The client device accessing encrypted media content at the content management server may not be able to view the encrypted media content unless the client device includes a cryptographic plugin, a device application (e.g., a web browser), or a browser extension that allows the client device to decrypt and view the encrypted media content. In one example embodiment, the cryptographic plugin operates with the user's system issued encryption/decryption keys. The encrypted media content may not be viewable by any client device with any other mechanism (e.g., standard browser or standard media player (Windows, Apple, etc). Therefore, copying of the link or the encrypted media content may be worthless.

The content management server described in this document enables encryption and storage of media content, access to users via authentication (e.g., password), viewing of the media content from any web browser with cryptographic plugin, and prevents copying of the encrypted media content viewed within the web browser.

With respect to the encryption of the media content, in one example embodiment, the content management server creates a X.509 public/private key pair per enterprise that utilizes the service. The private key pair may be stored by the enterprise server. In another example, the enterprise server stores the private key pair (and a remote signing functionality is created). Each time an enterprise is signed up for the content management service provided by the content management server, a dedicated X.509 public/private key pair may be associated with the enterprise, and/or subsets of groups of users or an individual user. For example, the key pair can be generated from an on-premise Certificate of Authority (CA) system, obtained from a third party CA services (Verisign, Entrust, RSA, etc.), or obtained from the enterprise itself (self-signed).

With respect to the storage of the media content, the media content may be saved on premise by the content management server which may use the escrowed private key to encrypt media content files—or some other associated private key system. For example, a single key pair may be used for all the media content files in the enterprise. In another example, delegated keys can be created for subgroups of users of the enterprise. The media content server may not provide direct access to these media content files to outsiders, including the enterprise that utilizes these files. The only interface to these media content files may be via a video management application hosted by the content management server. The content management server may have access to the keys and has the ability to encrypt and decrypt the stored media content files. The Content management server may associate the identity authenticate by the system with the proper encryption keys for storage.

With respect to accessing and viewing the encrypted media content, a custom browser extension (or plug-in) may be formed to utilize the certificate for decryption of the file. The keys are session specific—and may be dynamically generated per session or accessed and utilized from a central key repository. In another example, a standalone application (desktop or mobile) may also be used to access and view the encrypted media content.

In the example of a web browser extension (or plug-in), a public browser component may be made available to any user of a client device. For example, the user downloads the extension from the Google Chrome Store. The version of this extension has no associated private/public key pair but instead is a facilitator for the acceptance/ownership of the key pair. In other words, the extension does not come pre-loaded with any specific identity. Once the client device downloads and install the browser plug-in, the user of the client device is now ready to access encrypted media content from the content management server. The user directs the browser (or application) to the content management server. The identity of the user may then be established, for example, via an authentication mechanism based on credentials held at the enterprise. In other examples, the identity could be "accepted" by the cloud service via a federated SSO mechanism such as SAML, WS-Fed, OAUTH, OpenID, OpenID Connect or some other federated technology.

Once the user, and thus the user's associated enterprise identity, is accepted, the content management server delivers to the client device of the user his escrowed certificate keys for the purpose of encrypting/decrypting the associated media content files.

If the user wishes to upload media content files, the interface would walk the user through a set of web (or application pages) allowing the user to upload the media content files. The content management server may then associate the proper keys for storage of the media content files. Therefore, the media content files may be stored in an encrypted form.

If the user wishes to view a media content file, the associated user keys are downloaded in temporary storage by the browser extension (or application) and are used for the decryption of the media content file for non-persistent viewing.

In one example embodiment, the keys may be dynamically pushed down to the client device of the user upon request for encryption. For example, the keys may be pushed down based on a set of hashed parameters. The hash may be mapped from the client device that has successfully authenticated to the content management server. The content management server may conduct a browser/webserver authentication. At the authentication time, the content management server, in addition to authenticating the user, pulls uniquely identifiable information from the client device (e.g., via HTML5 browser attributes) to create a unique device hash for the client device. These parameters can include, for example, Browser Information (Type, Version, Last Update), standard HTTP headers (Accept, Accept-Charset, Accept-Encoding, Accept-Language, User-Agent, additional parameters can include Browser Plugin List, Browser Flash Font List, Browser timezone, HTML Storage Support, HTML5 LocalStorage and HTML SessionStorage. These parameters may be used to create a hash—and this hash may be used to encrypt the keys passed down to the client browser extension. Both client and server sides may conduct the same hash—and thus no prior/master key has to be sent.) The solution would have the server first establish what version of the client plug-in is running—so that the server could be insured to execute the exact version of the HTML5 browser attribute gathering algorithm.

If the solution is not enacted through a browser, but instead the client piece is a software component—such as a mobile application. A similar mutual scanning of device information would be conducted by both the server and the client side. In this case, the server and the mobile application pull information such as device information, device type, device serial number—and/all information that can be pulled from a client app.

In another example embodiment, the viewer (browser extension or application) may disallow the attempts to take the media content file and then create a duplication of the media content file (e.g., for example, using a streaming to file conversion tool). This would be enabled because the content is encrypted, and known media copy tools like www.clipconverter.cc or youtubeinmp4.com and youtubemp4s.com.

In one example embodiment, an authentication server receives authentication credentials from a browser of a client device. The authentication server authenticates a user of the client device based on the authentication credentials, assigns an identity to the authenticated user based on a media licensing service and maps the assigned identity to the authenticated user. The authentication server communicates, via a webservice, the identity to a key server, the key server generating a public and private key pair, a name of a certificate for the public key mapped to the identity assigned to the authenticated user. A key server forms a hash based on web session attributes of the browser of the client device. The web session attributes comprises HMTL parameters for the browser requesting a certificate. The key server encrypts the public and private key pair with the hash and communicates the encrypted key pair to a browser extension of the browser of the client device. The browser extension stores the certificate at the client device and decrypts the encrypted key pair using the hash.

In another example embodiment, the authentication server receives a request from the client device to access encrypted media content stored at a media content server. The encrypted media content is encrypted with the public and private key pair associated with the identity assigned to the user a group identity assigned to the user. The request identifies the encrypted media content and the certificate. The license server validates the request based on a verification of a signature of the certificate and a confirmed identity contained in the certificate. The license server retrieves a shared key associated with the encrypted media content identified in the request, and communicates the shared key to the browser extension of the browser of the client device and to an active key cache of the media content server. The license server encrypts license information with public key. The license information comprises at least one of the shared key, a URL identifier for use in accessing the encrypted media content. The license server signs the license information with the private key, and communicates the license information to the browser extension of the web browser of the client device.

In one example embodiment, a media server authenticates a user of a client device. The media server retrieves a private key stored at the media server, (either stored or dynamically created). The solution then encrypts the private key with a hash based on web session attributes of the client device. The server provides the encrypted private key to the client device after authentication of the user. The media server provides encrypted media content to the client device in response to a request from the client device. The client device decrypts the private key and decrypts the encrypted media content with the decrypted private key.

In another example embodiment, a media server receives authentication credentials from a client device and authenticates a user of the client device based on the authentication credentials. The media server retrieves a private key stored at the media server or creates a session key dynamically. The private key is associated with the authenticated user. The media server accesses web session attributes from the client device and generates a hash of the client device based on the web session (or application) attributes which identify the device. The media server then encrypts the private key with the hash and provides the encrypted private key to the client device. The client device decrypts the private key based on the hash of the client device.

In another example embodiment, the media server receives a request from the client device to access encrypted media content stored at the media server. The stored data could be encrypted with the session key utilized for the encryption/authentication of the transmitted traffic—or it can be a separate key system that encrypts the content at rest. In a further embodiment, the media content may not be stored locally—but could come from a streaming feed from a third party content provider—a CDN (Content Delivery Network).

In another example embodiment, the media server identifies encrypted media content stored at the media server and accessible by the user based on an access privilege configuration of the user. The access privilege configuration is provided by an enterprise server. The media server provides the identified encrypted media content to the client device.

In another example embodiment, the media server generates a public key and a corresponding private key. The media server receives unencrypted media content and encrypts the unencrypted media content with the public key. The encrypted media content and the corresponding private key are stored at the media server.

In another example embodiment, the media server generates a public key and a corresponding private key. The media server receives unencrypted media content, for example from a $3^{rd}$ party CDN (Content Delivery Network) and encrypts the unencrypted media content with the public key. The encrypted media content is stored at the media server. The key utilized by the service is stored at the enterprise server or separate secure container. The enterprise server provides the private key to the client device in response to authenticating the user via the hash encryption system detailed above.

In another example embodiment, the media server receives a public key and a corresponding private key from an enterprise server. The media server receives unencrypted media content and encrypts the unencrypted media content with the public key. The encrypted media content and the corresponding private key are stored at the media server.

In another example embodiment, the media server receives the authentication credentials from a plug-in of a web browser of the client device. The media server provides the encrypted private key to the plug-in of the web browser of the client device. The media server receives the request to access encrypted media content from the plug-in of the web browser of the client device, and provides the encrypted media content to the plug-in of the web browser of the client device in response to the request. The plug-in of the web browser decrypts the encrypted media content with the private key and displays the decrypted media content in the web browser.

In another example embodiment, the media server receives a request to upload unencrypted media content from a plug-in of a web browser of the client device. The media server authenticates the client device in response to the request and provides a public key to the plug-in of the web browser. The plug-in encrypts the unencrypted media content from the web browser with the public key. The media server receives the encrypted media content from the web browser of the client device.

FIG. 1 is a network diagram illustrating a network environment 100 suitable for securing media content via certificate-issuing cloud service, according to some example embodiments. The network environment 100 includes a network-based system 105, devices 130 and 150, all communicatively coupled to each other via a network 190. The network-based system 105 may include a media content storage device 102, a key storage device 104, a media server 106, an identity authentication machine 108, and a key authentication machine 110. The media server 106 may form part of the network-based system 105 (e.g., a cloud-based server system configured to provide one or more services to the devices 130 and 150). The media server 106 and the devices 130 and 150 may each be implemented in a computer system, in whole or in part, as described below with respect to FIG. 10.

The media content storage device 102 may store encrypted and unencrypted media content. The media content may include media files (e.g., video files). The media content may include metadata that identifies an enterprise service to which the media content is associated with.

The key storage device 104 may store public and private key pairs generated by the media server 106. The public and private key pairs may be generated by an enterprise server and stored at the key storage device 104.

The identity authentication machine 108 receives authentication credentials provided by the device 150 (e.g., username and password) and authenticates a user of the device 150 based on the authentication credentials. In another example embodiment, a SSO token may be used to identify/authenticate the user 152 at the device 150.

The key authentication machine 110 retrieves a private key associated with the authenticated user 152 from the key storage device 104. The key authentication machine 110 also accesses unique attributes (e.g., web session attributes) from the device 150 and generates a hash of the device 150 based on the unique attributes. The key authentication machine 110 encrypts the private key with the hash and provides the encrypted private key to the device 150. The device 150 can then decrypt the received encrypted private key from the key authentication machine 110 using the hash of the device 150.

The media server 106 receives a request from the device 150 to access encrypted media content stored at the media server 106. The encrypted media content is encrypted with a public key corresponding to the private key. The media server 106 provides the encrypted media content to the device 150 in response to the request. The device 150 decrypts the encrypted media content using the private key. The private key is deleted from the device 150 after the encrypted media content has been displayed.

In another example embodiment, the device 150 downloads a publically available web browser extension. The identity authentication machine 108 authenticates the user 152 of the device 150 based on enterprise SSO or authentication credentials. The identity authentication machine 108 may further associate the user 152 to a corresponding enterprise service based on the authentication credentials. The key authentication machine 110 and the device 150 both create an HTML5 browser hash of the device 150. The hash may be used to securely exchange keys. The encrypted keys are sent down to the device 150. The device 150 may decrypt the encrypted key based on the hash of the device 150. A web browser extension or application in the device 150 may temporarily store the decrypted key based on the web session with the key authentication machine 110. The device 150 may request encrypted media content from the media server 106. The device 150 may decrypt the encrypted media content using the decrypted key.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices 130, 150 shown in FIG. 1 may be implemented in a general-purpose computer modified (e.g., configured or programmed) by software (e.g., one or more software modules) to be a special-purpose computer to perform one or more of the functions described herein for that machine, database, or device 130, 150. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices 130, 150 illustrated in FIG. 1 may be combined into a single machine, and the functions described herein for any single machine, database, or device 130, 150 may be subdivided among multiple machines, databases, or devices 130, 150. The content can also be derived from a CDN (Content Delivery Network)—a 3$^{rd}$ party content provider.

The network 190 may be any network that enables communication between or among machines, databases, and devices (e.g., the key authentication machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
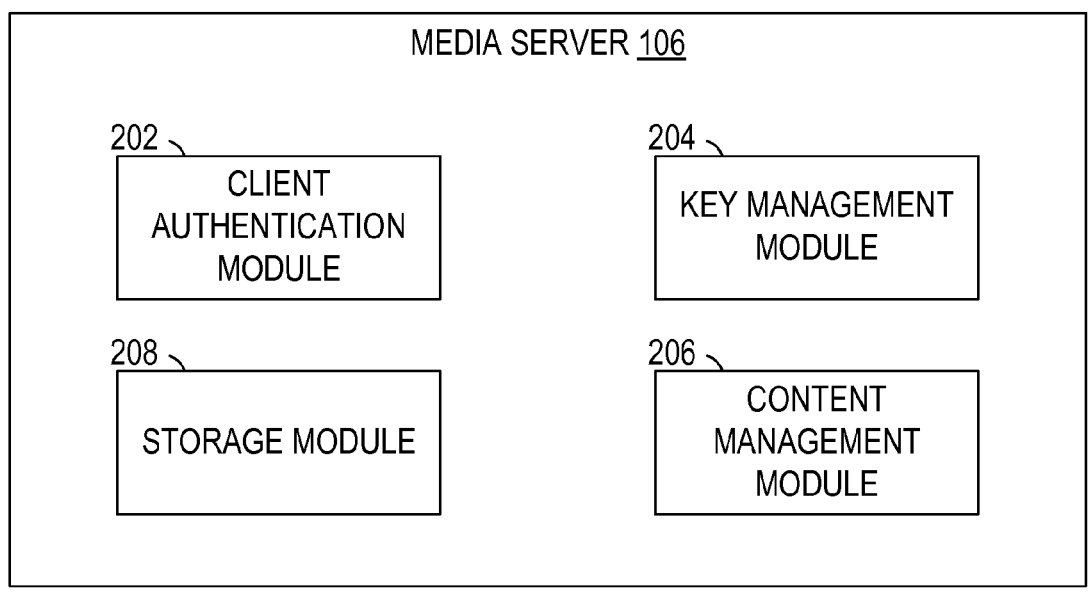
FIG. 2 is a block diagram illustrating components of a media server suitable for issuing certificate and storing encrypted media content, according to some example embodiments.

FIG. 2 is a block diagram illustrating components of the media server 106 of FIG. 1, according to some example embodiments. The media server 106 is shown as including a client authentication module 202, a key management module 204, a content management module 206, and a storage module 208, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device 130, 150 may be distributed across multiple machines, databases, or devices 130, 150.

The client authentication module 202 may communicate with the identity authentication machine 108 to confirm and authenticate the identity of the user 152 at the device 150. In one example embodiment, the device 150 provides authentication credentials in the form of a two-factor credential (e.g., a username and password) to the identity authentication machine 108 for authentication. Once the identity of the user 152 is authenticated, the identity authentication machine 108 sends a confirmation to the client authentication module 202 that the user 152 is authenticated. In another example embodiment, the client authentication module 202 receives the authentication credentials from the device 150 and validates the authentication credentials by comparing the received authentication credentials against an authentication database stored at the identity authentication machine 108 or stored locally at the media server 106. In another example embodiment, the identity authentication machine 108 uses a single-sign on (SSO) authentication mechanism, accepting of an accepting SSO token (OpenID, OpenID connect, SAML, WS-Fed, OAUTH, etc) to authenticate the device 150 and provides confirmation of the authentication to the client authentication module 202. Those of ordinary skill in the art will recognize that other types of authentication mechanisms may be used to validate the identity of the user 152 and provides confirmation of the validation to the client authentication module 202.

The key management module 204 generates key pairs (e.g., public and private keys) at the media server 106 or receives key pairs from another server (e.g., enterprise server). The key pairs may be associated with different users 132, 152 based on their administrative levels. For example, a first public/private key pair may be associated with users 132, 152 who have registered for a free service associated with the enterprise server. Another public/private key pair may be associated with users 132, 152 who have signed up for a paid premium service from the enterprise server. The enterprise server may specify and provide the administrative level or service level of the user 132, 152 to the key management module 204 in a configuration file. For example, the key management module 204 may generate a first key pair and a second key pair. The configuration file may specify that a first group of users (e.g., users 132, 152 with free service) are associated with the first key pair. The configuration file may specify that a second group of users (e.g., users 132, 152 with paid service) are associated with the second key pair.

The key management module 204 may encrypt a private key from a key pair using a device identification process (e.g., a hash of the device 150) accessing the media server 106. For example, the device 150 may include a web browser accessing the media server 106. Once the client authentication module 202 authenticates the device 150, the key management module 204 maps a hash to the authenticated device 150. The hash may be computed based on identifiable unique information from the device 150 (e.g., via HTML5 attributes of the web browser of the device 150). The attributes or parameters used to compute the hash may include, for example, browser information (Type, version, latest update), standard HTTP headers (Accept, Accept-Charset, Accept-Encoding, Accept-Language, User-Agent, additional parameters can include Browser Plugin List, Browser Flash Font List, Browser time zone, HTML Storage Support, HTML5 Local Storage and HTML Session Storage, among others. Both the key management module 204 and the plugin of the web browser at the device 150 can compute the same hash based on the same attributes from the web browser. Once the hash is computed for the device 150, the key management module 204 identifies the private key corresponding to the authenticated user 132, 152 of the device 150. The corresponding private key is encrypted based on the computed hash. Those of ordinary skill in the art will recognize that cryptographic hash functions can be performed in many different ways or algorithms based on the computed hash value. The private keys are encrypted using the computed hash value. The encrypted private key corresponding to the device 150 or the user 152 may be communicated over the network 190 to the plugin of the web browser of the device 150. The device 150 can then decrypt the encrypted private key using the same hash.

The content management module 206 encrypts media content stored in the media content storage device 102 with a public key corresponding to a private key pair. In one example embodiment, the content management module 206 identifies a public key corresponding to a key pair associated with the user 152. For example, the content management module 206 identifies a first public key associated with users 132, 152 with a free account and encrypts a media file (e.g., video) using the first public key. The content management module 206 provides the media file encrypted with the first public key to the device 150. In another example, the content management module 206 identifies a second public key associated with users 132, 152 with a paid account and encrypts a media file (e.g., video) using the second public key. The content management module 206 provides the media file encrypted with the second public key to the device 130 with user 132 who is has a paid account. Therefore, the media file may be encrypted with one or more public key based on a configuration of the level of service provided by an enterprise server. In other examples, the media content storage device 102 may store one or more encrypted versions of the same media file.

In another example embodiment, the content management module 206 receives a configuration file from an enterprise server that specifies the media content associated with the first key pair and the second key pair. For example, a first group of media content may be associated with the first key pair and corresponding users 132, 152. A second group of media content may be associated with the second key pair and corresponding users 132, 152.

The storage module 208 may be configured to communicate with the media content storage device 102 to access encrypted and unencrypted media content, configuration files, and key pairs. The storage module 208 may also be configured to store the encrypted private keys in the media content storage device 102.

Figure 3:
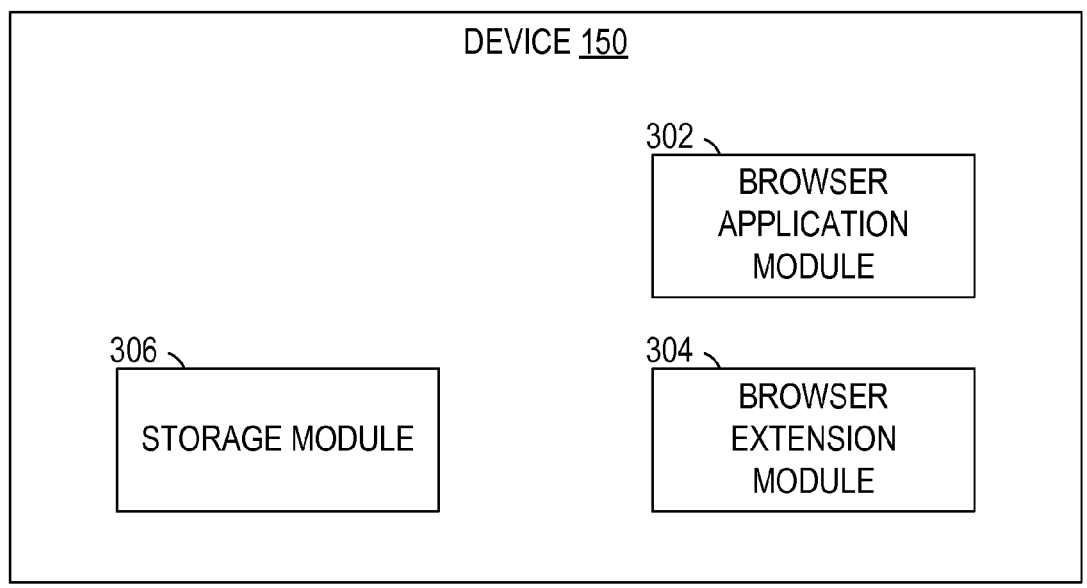
FIG. 3 is a block diagram illustrating components of a client device suitable for accessing encrypted media content from the media server of FIG. 2, according to some example embodiments.

FIG. 3 is a block diagram illustrating components of the device 150 suitable for accessing encrypted media content from the media server 106 of FIG. 2, according to some example embodiments. The device 150 is shown as including a browser application module 302, a browser extension module 304, and a storage module 306, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device 130, 150 may be distributed across multiple machines, databases, or devices 130, 150.

The browser application module 302 may include a web browser or an application configured to communicate with the network-based system 105. The browser extension module 304 enables the web browser to perform additional functions. For example, the browser extension module 304 may be configured to communicate with the identity authentication machine 108 to authenticate the user 152 of the device 150. The browser extension module 304 may be configured to communicate with the key authentication machine 110 to identify and retrieve a (encrypted or unencrypted) private key corresponding to requested media content from the media server 106. The browser extension module 304 may be configured to request encrypted media content from the media server 106. The browser extension module 304 determines a set of unique attributes and parameters from the web communication session between the browser application module 302 and the media server 106. The browser extension module 304 computes a hash value based on the set of unique attributes and parameters. The browser extension module 304 decrypts the encrypted private key based on the computed hash value and uses the unencrypted private key to decrypt the encrypted media content for (non-persistent) viewing within the browser application module 302.

In another example embodiment, the browser extension module 304 may be used to upload media content to the media server 106. The browser extension module 304 may encrypt media content with a public key corresponding to the private key provided by the media server 106. The browser extension module 304 then uploads the encrypted media content to the media server 106. The storage module 306 may be configured to temporarily store the hash value and the encrypted private key at the device 150.

Figure 4A:
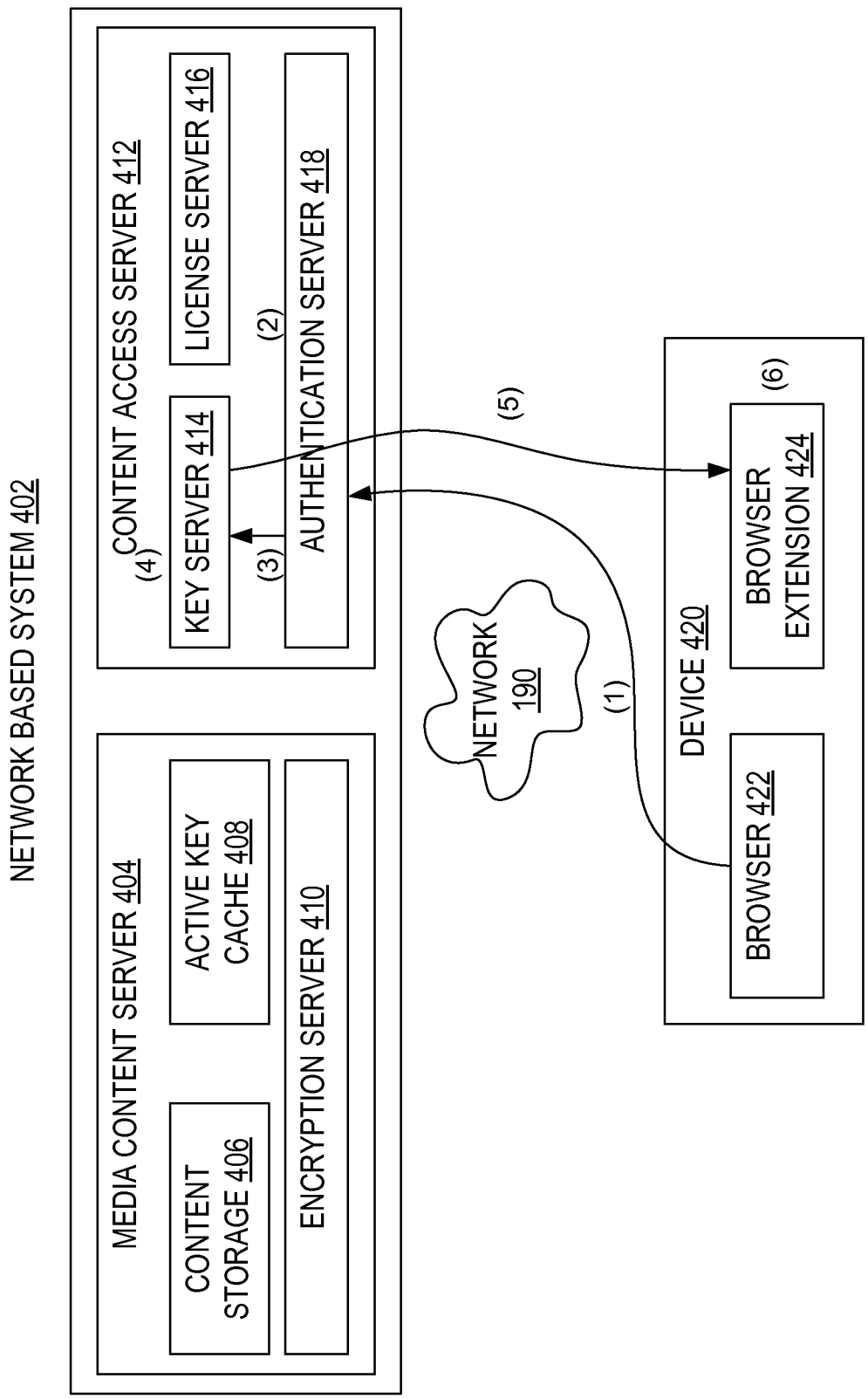
FIG. 4A is a block diagram illustrating an example embodiment of a certificate delivery operation.

FIG. 4A is a block diagram illustrating an example embodiment of a certificate delivery operation in a network based system 402. At step (1), an authentication server 418 of a content access server 412 receives authentication information from the browser 422 and performs user authentication. The authentication server 418 can include any of and/or combination of authentication methods: Username/Password from local or remote directory, two-factor authentication, SMS, Telephony, Push, X.509, biometric, federated identity from outside identity service, OAUTH (Facebook, Google, Twitter), SAML (from a trusted Identity Provider), WS-* (Microsoft service), and other such as openID, OpenIDConnect, etc. After the authentication, an identity is mapped from the user's credential to an identity that the licensing service will be able to recognize the user. For the purpose of this discussion, the name will be called "CN" (for "Common Name").

At step (2), the authentication server 418 generates an encryption hash. For example, the two elements involved in the server/client discussion both generate an encryption hash that can be based on the browser 422 that is part of the streaming video. The hash may use all the HTML5 distinct attributes of this browser 422.

These parameters can include, for example, Browser Information (Type, Version, Last Update), standard HTTP headers (Accept, Accept-Charset, Accept-Encoding, Accept-Language, User-Agent, additional parameters can include Browser Plugin List, Browser Flash Font List, Browser timezone, HTML Storage Support, HTML5 LocalStorage and HTML SessionStorage. These parameters may be used to create a hash—and this hash may be used to encrypt the keys passed down to the client browser extension. Both client and server sides would conduct the same hash—and thus no prior/master key has to be sent.)

At step (3), the authentication service calls, via a webservice, a key server 414. The key server 414 receives the "CN" from the authentication server 418. The key server, 414, also receives the browser device hash, formulated from the authentication server 418.

At step (4), the key server 414 generates a X.509 PUBLIC/PRIVATE key pair. The name of the certificate is mapped to the "CN" from the authentication server 418.

At step (5), the key server 414 wraps the Private Public Key pair, via a P12 package by a HTML5 hash and sends it encrypted to browser extension 424.

At step (6), browser extension 424 stores x.509 license certificate in a "known" browser certificate store. For example, this will be a place where a third party service—be it this "Secure Video Streaming" cloud's licensing service or some other licensing service would be able to locate and utilize the X.509 licensing certificate.

Figure 4B:
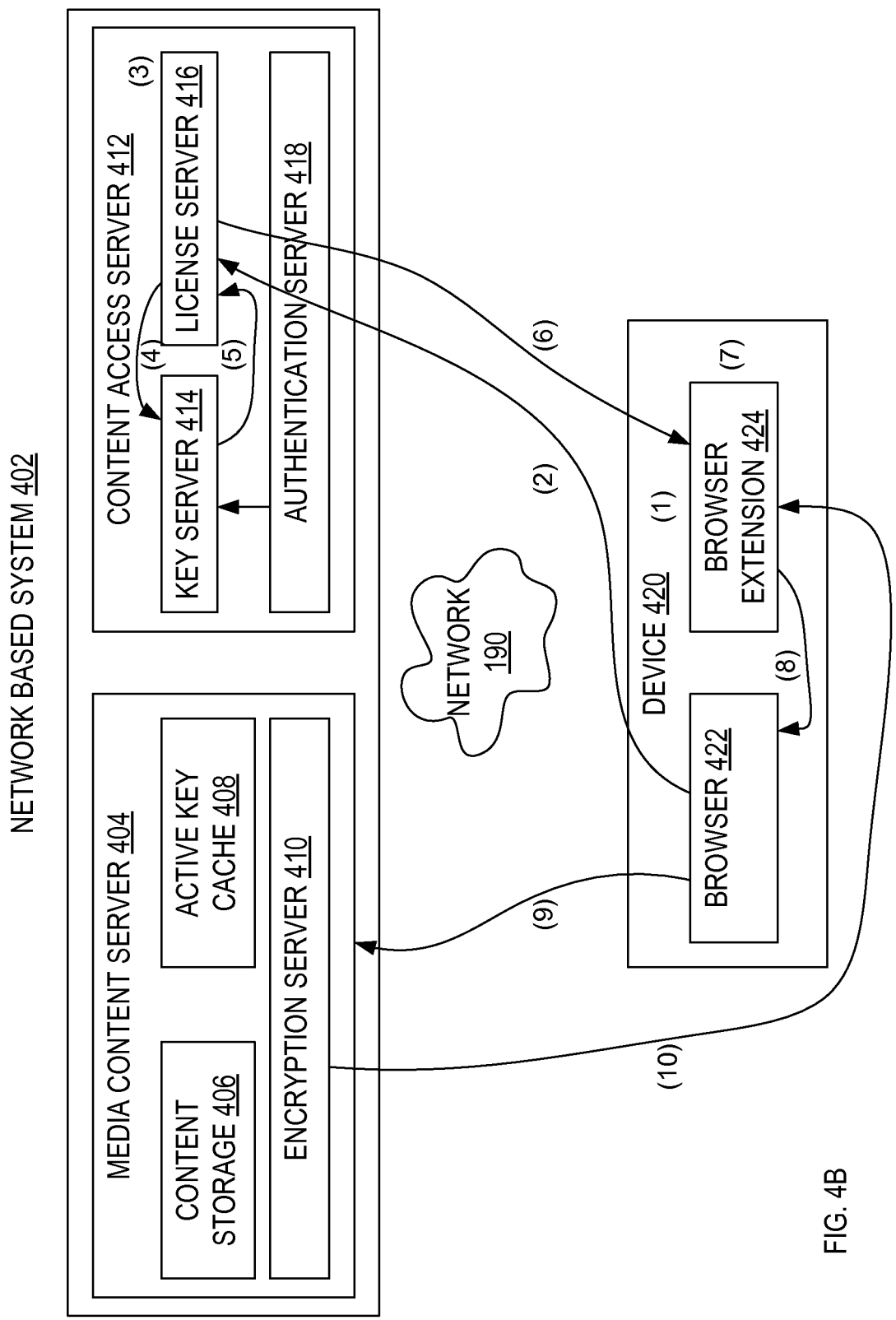
FIG. 4B is a block diagram illustrating an example embodiment of a media request operation.

FIG. 4B is a block diagram illustrating an example embodiment of a media request operation in a network based system 402. At step (1), the browser extension 424 creates a license request. This is a message containing at minimum an identifier for the content which is to be viewed and the X.509 certificate. This message may be signed by the browser extension 424 with the assumed X.509 certificate's private key.

At step (2), the browser extension 424 transmits the license request to the license server 416 through the browser 422.

At step (3), the license server 416 validates the license request by verifying the signature with the X.509 certificate and confirming the identity contained in the certificate.

At step (4), the license server 416 communicates with the key server 414. The key server 414 generates or retrieves the "shared key(s)" associated with the content identified in the license request. The "shared key(s)" may be passed to the Browser Extension 424. The "shared key(s)" may be passed to active key cache 408 of media content server 404.

At step (5), the license server 416 encrypts and signs the license information. This message contains at a minimum: the "shared key(s)", an identifier (url) for use in accessing the media content. The message may be encrypted with the Browser Extension 424's public key from the X.509 certification and signed with the license server 416's private key.

At step (6), the license information message is transmitted to the browser extension 424 through the browser 422.

At step (7), the browser extension 424 accepts the license information message, validates the signature of the license server 416, and decrypts the license information.

At step (8), the browser extension 424 passes the identifier for the media content to the browser 422.

At step (9), the browser 422 establishes a connection with the media content server 404.

At step (10), the browser 422 displays the identified media content with the following loop:

Browser 422 receives a Content Frame encrypted with the "shared key(s)";

Browser 422 calls Browser Extension 424 with Content Frame encrypted with the "shared key(s)";

Browser Extension 424 decrypts Content Frame encrypted with the "shared key(s)" to Content Frame;

Browser Extension 424 returns Content Frame to browser 422; and

Browser 422 renders Content Frame.

Figure 5:
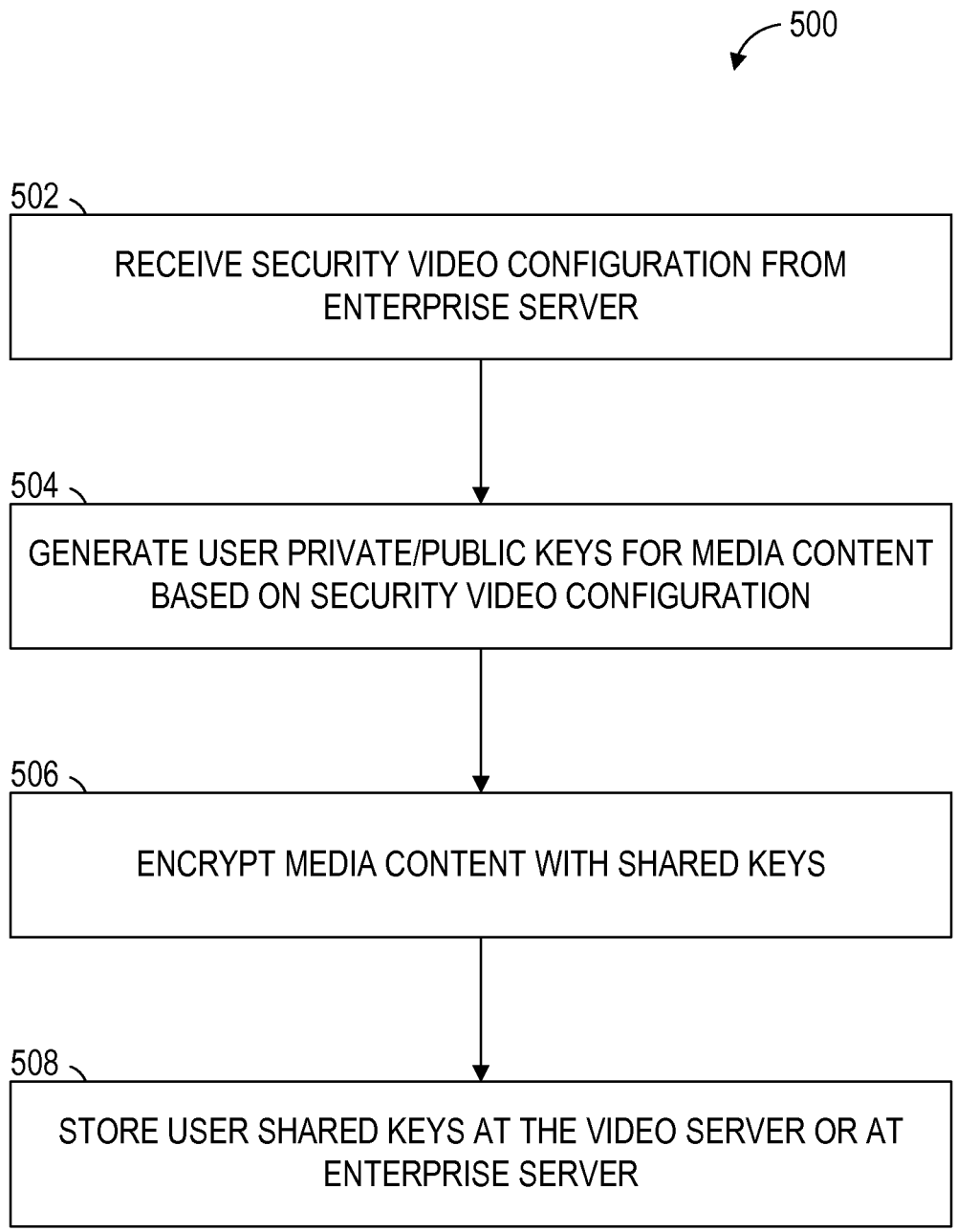
FIG. 5-8 are flowcharts illustrating operations of a media server in performing a method of issuing certificate and storing encrypted media content, according to some example embodiments.

FIG. 5 is a flowchart illustrating operations of a media server 106 in performing a method 500 of issuing a certificate and storing encrypted media content, according to some example embodiments. At operation 502, the media server 106 receives security video configuration (e.g., privilege access levels to the encrypted media content) from a third party server (e.g., an enterprise server). At operation 504, the media server 106 generates a key pair for the media content based on the security video configuration. In one example embodiment, operation 504 may be implemented with key management module 204. At operation 506, the media server 106 encrypts media content with a shared key from the key pair. In one example embodiment, operation 504 may be implemented with key management module 204. At operation 508, the media server 106 stores the private key in the media content storage device 102 or outside the network-based system 105 (e.g., an enterprise server external to the media server 106). Operations in the method 500 may be performed by the media server 106, using modules described above with respect to FIG. 2.

Figure 6:
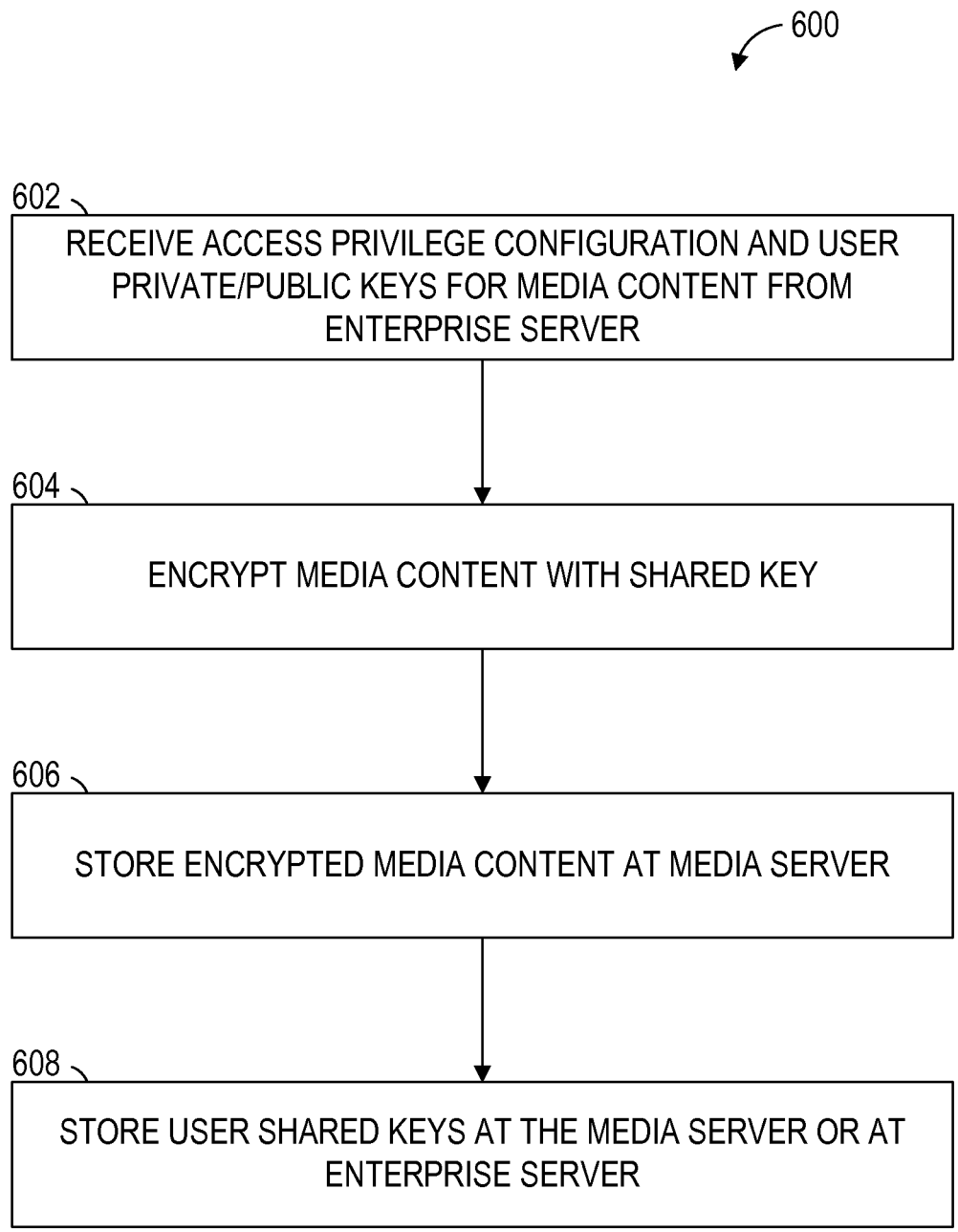

FIG. 6 is a flowchart illustrating operations of a media server 106 in performing a method 600 of issuing a certificate and storing encrypted media content, according to another example embodiment. At operation 602, the media server 106 receives access privilege configuration and user key pair for media content from an enterprise server. The access privilege configuration defines the access level of a user 132, 152 and identifies the key pair corresponding to the user 132, 152. At operation 604, the media server 106 encrypts the media content with the shared key. In one example embodiment, operation 604 may be implemented with key management module 204. At operation 606, the media server 106 stores the encrypted media content. At operation 608, the media server 106 stores the shared key at the media server 106 in the media content storage device 102 or outside the network-based system 105 (e.g., an enterprise server external to the media server 106). Operations in the method 600 may be performed by the media server 106, using modules described above with respect to FIG. 2.

Figure 7:
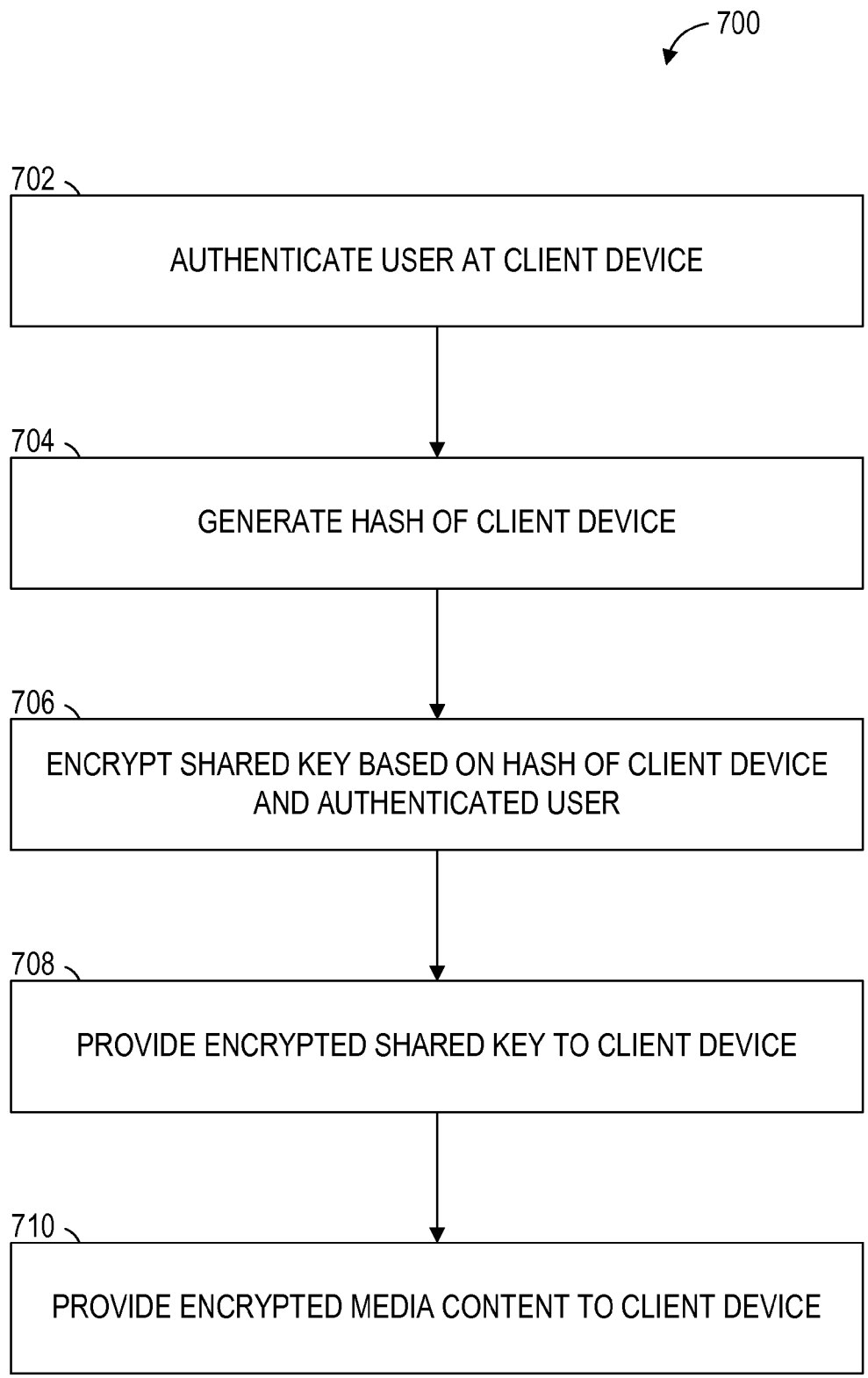

FIG. 7 is a flowchart illustrating operations of a media server 106 in performing a method 700 of issuing a certificate and storing encrypted media content, according to another example embodiment. At operation 702, the media server 106 authenticates a user 152 at a device 150. In one example embodiment, operation 702 may be implemented with the identify authentication machine 108 or with the client authentication module 202. At operation 704, the media server 106 generates a hash value for the device 150. In one example embodiment, operation 704 may be implemented with the key management module 204. At operation 706, the media server 106 encrypts a shared key based on the hash value for the device 150 and in response to authenticating the user 152. In one example embodiment, operation 706 may be implemented with the key management module 204. At operation 708, the media server 106 provides the encrypted shared key to the client device 150. In one example embodiment, operation 708 may be implemented with the key management module 204. At operation 710, the media server 106 provides the encrypted media content to the client device. In one example embodiment, operation 710 may be implemented with the content management module 206. Operations in the method 700 may be performed by the media server 106, using modules described above with respect to FIG. 2.

Figure 8:
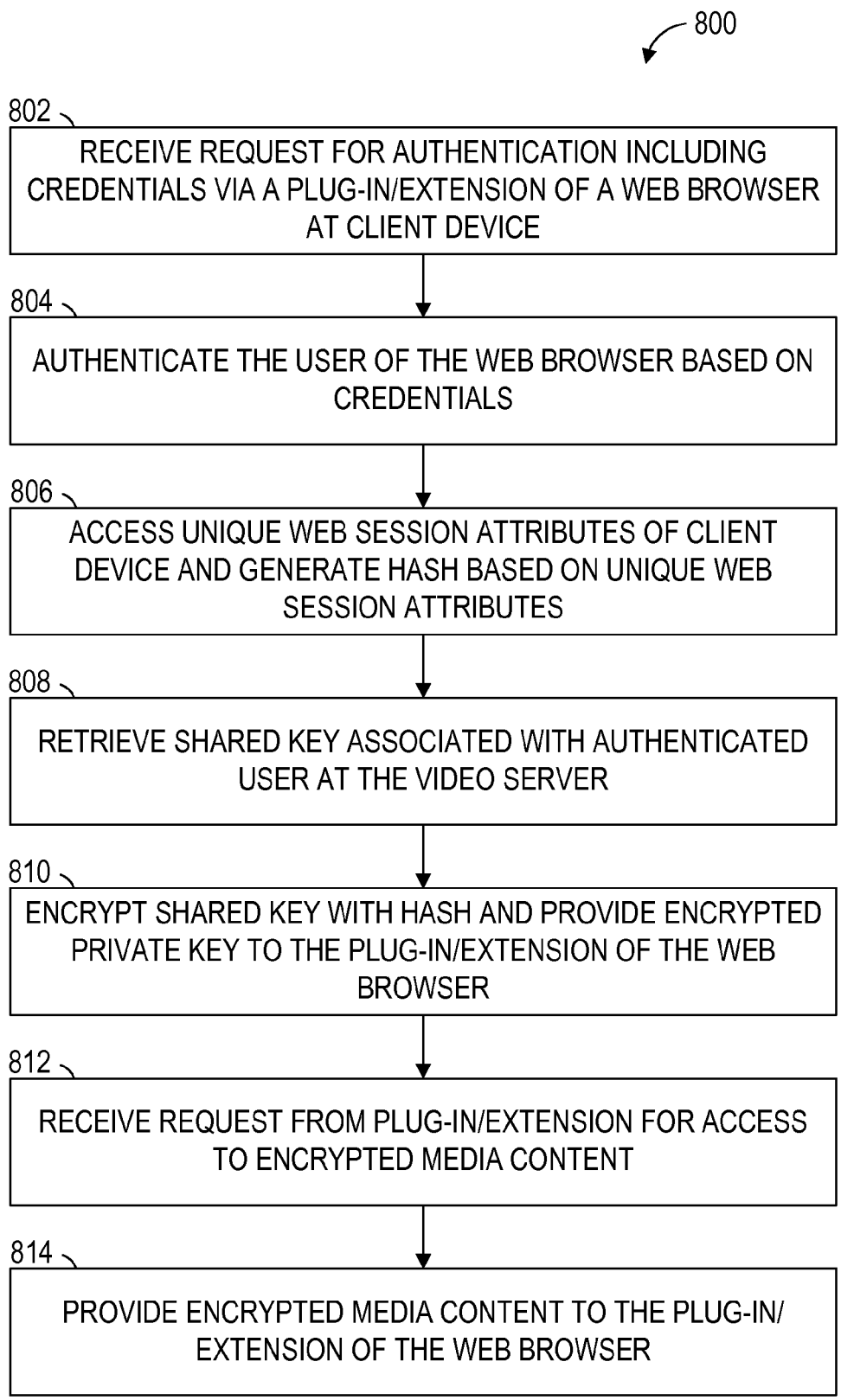

FIG. 8 is a flowchart illustrating operations of a media server 106 in performing a method 800 of issuing a certificate and storing encrypted media content, according to another example embodiment. At operation 802, the media server 106 receives a request for authentication from a plugin or an extension of a web browser. The request may include user credentials. At operation 804, the media server 106 authenticates the user 152 of the web browser based on the credentials. At operation 806, the media server 106 accesses unique web session attributes of the client device and generates a hash value based on the unique web session attributes of the client device. At operation 808, the media server 106 retrieves a shared key associated with the authenticated user 132, 152. At operation 810, the media server 106 encrypts the shared key with the hash value and provides the encrypted private key to the plug-in/extension of the web browser of the client device. At operation 812, the media server 106 receives a request from the plug-in/extension of the web browser of the client device to access encrypted media content stored at the media server 106 (or outside the media server 106). At operation 814, the media server 106 provides the encrypted media content to the plug-in/extension of the web browser of the client device. Operations in the method 800 may be performed by the media server 106, using modules described above with respect to FIG. 2.

Figure 9:
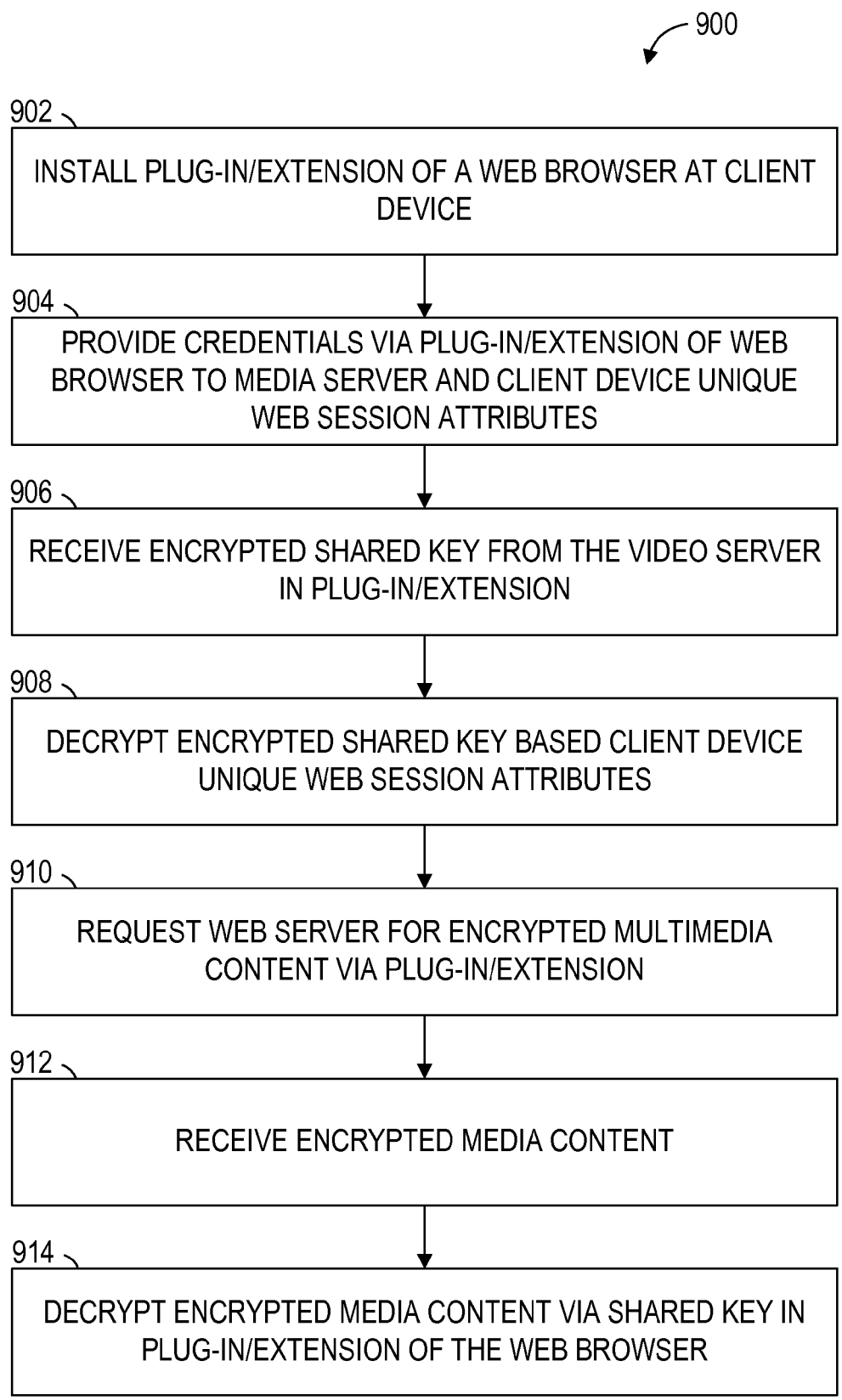
FIG. 9 is a flowchart illustrating operations of a device in performing a method of accessing encrypted media content, according to some example embodiments.

FIG. 9 is a flowchart illustrating operations of a device 150 in performing a method 900 of accessing encrypted media content, according to some example embodiments. At operation 902, the device 150 installs a plug-in/extension for a web browser to communicate with the media server 106 and performs functions related to generating a hash value to decrypt a shared key and use the shared key to decrypt media content from the media server 106. At operation 904, the device 150 provides credentials and unique web session attributes via the plugin or extension of the web browser to the media server 106. At operation 906, the device 150 receives one or more encrypted shared key from the media server 106 based on the credentials of the user 152. At operation 908, the device 150 decrypts the encrypted shared key based on the unique web session attributes. At operation 910, the device 150 requests the web server for encrypted media content via the plug-in/extension. At operation 912, the device 150 receives the encrypted media content from the media server 106. At operation 914, the device 150 decrypts the media content using the unencrypted shared key as determined in operation 908. Operations in the method 900 may be performed by the media server 106, using modules described above with respect to FIG. 3.

Figure 10:
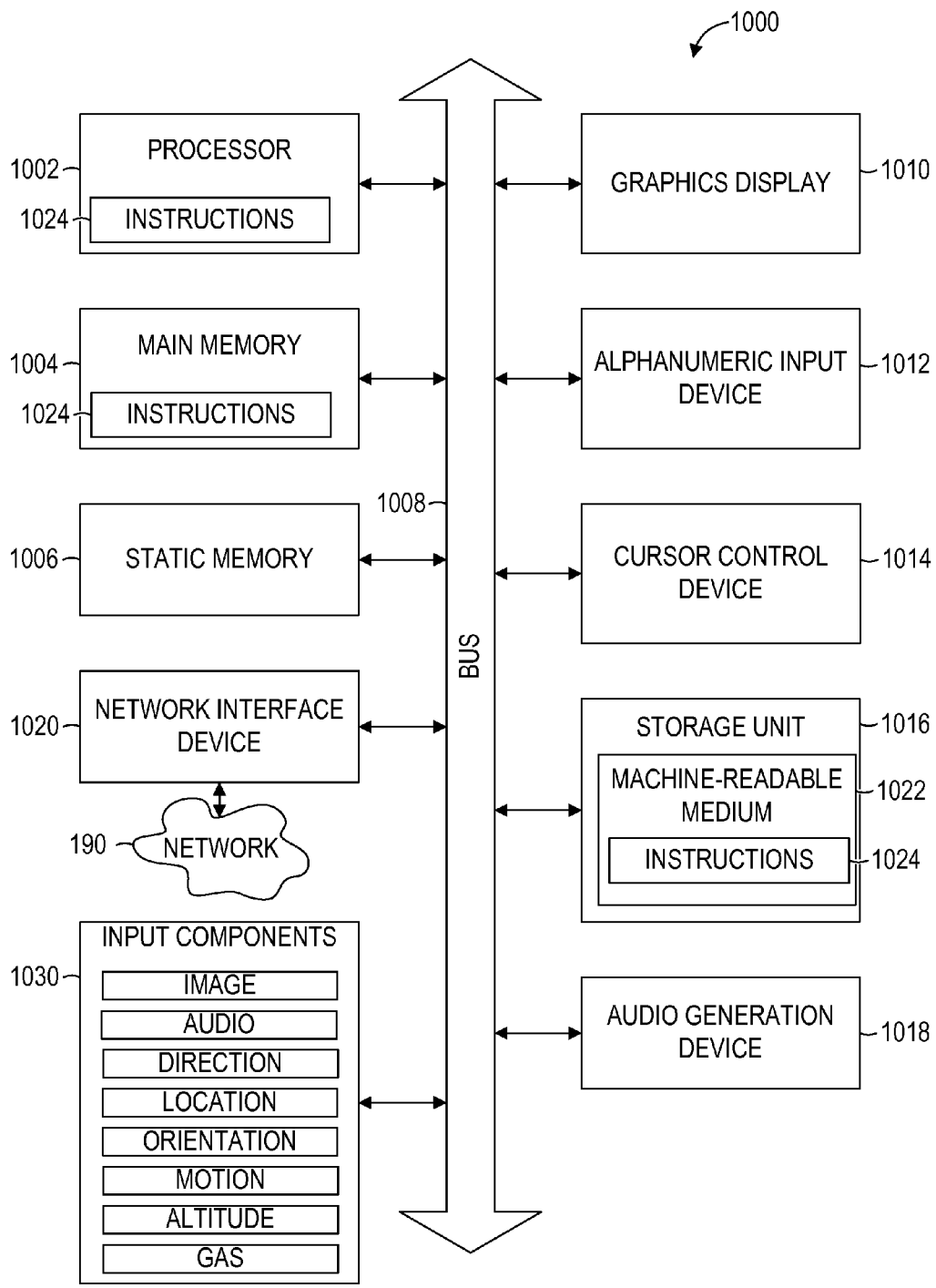
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device 130, 150 or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, an audio generation device 1018 (e.g., a sound card, an amplifier, a speaker, a headphone jack, or any suitable combination thereof), and a network interface device 1020.

The storage unit 1016 includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered machine-readable media 1022 (e.g., tangible and non-transitory machine-readable media). The instructions 1024 may be transmitted or received over the network 190 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device, such as a smart phone or tablet computer, and have one or more additional input components 1030 (e.g., sensors or gauges). Examples of such input components 1030 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components 1030 may be accessible and available for use by any of the modules described herein.

As used herein, the term "memory" refers to a machine-readable medium 1022 able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions 1024. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 1022 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1002 or a group of processors 1002) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 1002 or other programmable processor 1002. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 1002 configured by software to become a special-purpose processor, the general-purpose processor 1002 may be configured as respectively different special-purpose processors (e.g., comprising different hardware modules) at different times. Software (e.g., a software module) may accordingly configure one or more processors 1002, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 1008) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1002 that are temporarily configured (e.g., by software) or permanently configured to perform the relevant operations. Whether temporarily or permanently configured, such processors 1002 may constitute processor-implemented modules that operate to perform one or more operations or functions described herein. As used herein, "processor-implemented module" refers to a hardware module implemented using one or more processors 1002.

Similarly, the methods described herein may be at least partially processor-implemented, a processor 1002 being an example of hardware. For example, at least some of the operations of a method may be performed by one or more processors 1002 or processor-implemented modules. As used herein, "processor-implemented module" refers to a hardware module in which the hardware includes one or more processors 1002. Moreover, the one or more processors 1002 may also operate to support performance of the relevant operations in a "cloud computing" environment or as a "software as a service" (SaaS). For example, at least some of the operations may be performed by a group of computers (as examples of machines 1000 including processors 1002), with these operations being accessible via a network 190 (e.g., the Internet) and via one or more appropriate interfaces (e.g., an application program interface (API)).

The performance of certain operations may be distributed among the one or more processors 1002, not only residing within a single machine 1000, but deployed across a number of machines 1000. In some example embodiments, the one or more processors 1002 or processor-implemented modules may be located in a single geographic location (e.g., within a home environment, an office environment, or a server farm). In other example embodiments, the one or more processors 1002 or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 1000. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 1000 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    receiving, at an authentication server, authentication credentials from a browser of a client device;
    authenticating a user of the client device based on the authentication credentials;
    assigning an identity to the authenticated user based on a media licensing service and mapping the assigned identity to the authenticated user;
    communicating, via a webservice, the identity to a key server, the key server generating a public and private key pair, a name of a certificate for the public key mapped to the identity assigned to the authenticated user;
    forming, at the authentication server, a hash based on web session attributes of the browser of the client device, the web session attributes comprising HMTL parameters for the browser requesting a certificate;
    encrypting the public and private key pair with the hash; and
    communicating the encrypted key pair to a browser extension of the browser of the client device, the browser extension configured to form the same hash to decrypt the encrypted key pair, to store the certificate at the client device, and to decrypt the encrypted key pair using the hash.

2. The method of claim 1, wherein authenticating the user based on authentication credentials further comprises authenticating based on a combination of at least a username and password authentication, a two-factor authentication, and a federated identity from an outside identity service.

3. The method of claim 1, wherein the web session attributes comprise a combination of at least browser information, standard HTTP headers, browser plugin list, browser flash font list, browser time zone, HMTL storage support, HTML local storage, and HMTL session storage.

4. The method of claim 1, further comprising:
    receiving a request from the client device to access encrypted media content stored at a media content server, the encrypted media content encrypted with the public and private key pair associated with the identity assigned to the user a group identity assigned to the user, the request identifying the encrypted media content and the certificate;

validating the request, at a license server, based on a verification of a signature of the certificate and a confirmed identity contained in the certificate;

retrieving a shared key associated with the encrypted media content identified in the request;

communicating the shared key to the browser extension of the browser of the client device and to an active key cache of the media content server;

encrypting, at the license server, license information with public key, the license information comprising at least one of the shared key, a URL identifier for use in accessing the encrypted media content;

signing the license information with the private key; and communicating the license information to the browser extension of the web browser of the client device.

5. The method of claim 4, wherein the browser extension is configured to:

validate the signature of the license server and decrypts the license information; and communicate the identifier for the encrypted media content to the browser.

6. The method of claim 5, wherein the browser extension is configured to:

communicate with the media content server;

receive a content frame of the encrypted media content encrypted with the shared key;

decrypts the content frame; and render and display the content frame in the browser.

7. The method of claim 4, wherein the browser extension is configured to delete the shared key at the client device after the encrypted media content has been displayed.

8. The method of claim 1, further comprising:

identifying the encrypted media content stored at the media server and accessible by the user based on an access privilege configuration of the user, the access privilege configuration provided by an enterprise server; and providing the identified encrypted media content to the client device.

9. The method of claim 8, further comprising:

receiving unencrypted media content at the media content server;

encrypting the unencrypted media content with a set of storage keys associated with the user or a group the user is a member of; and storing the encrypted media content and associated keys in the media content server.

10. The method of claim 1, further comprising:

receiving the authentication credentials from the browser extension;

providing an encrypted shared key to the browser extension;

receiving a request to access encrypted media content from the browser extension; and providing the encrypted media content to the browser extension in response to the request, the browser extension configured to decrypt the encrypted media content with an associated shared key held by the media content server and display the decrypted media content in the web browser.

11. A content access device comprising: an authentication server configured to receive authentication credentials from a browser of a client device, to authenticate a user of the client device based on the authentication credentials, to assign an identity to the authenticated user based on a media licensing service, to map the assigned identity to the authenticated user; and a key server configured to receive, via a webservice from the authentication server, the assigned identity, to generate a public and private key pair, a name of a certificate for the public key mapped to the identity assigned to the authenticated user, the authentication server to form a hash based on web session attributes of the browser of the client device, the web session attributes comprising HMTL parameters for the browser requesting a certificate, to encrypt the public and private key pair with the hash, and to communicate the encrypted key pair to a browser extension of the browser of the client device, the browser extension configured to form the same hash to decrypt the encrypted key pair, to store the certificate at the client device, and to decrypt the encrypted key pair using the hash.

12. The content access device of claim 11, wherein the authentication server is configured to authenticate the user based on authentication credentials further comprises authenticating based on a combination of at least a username and password authentication, a two-factor authentication, and a federated identity from an outside identity service.

13. The content access device of claim 11, wherein the web session attributes comprise a combination of at least browser information, standard HTTP headers, browser plugin list, browser flash font list, browser time zone, HMTL storage support, HTML local storage, and HMTL session storage.

14. The content access device of claim 11, wherein the authentication server is configured to receive a request from the client device to access encrypted media content stored at a media content server, the encrypted media content encrypted with the public and private key pair associated with the identity assigned to the user a group identity assigned to the user, the request identifying the encrypted media content and the certificate; wherein the content access server further comprises: a license server configured to validate the request based on a verification of a signature of the certificate and a confirmed identity contained in the certificate, to retrieve a shared key associated with the encrypted media content identified in the request, to communicate the shared key to the browser extension of the browser of the client device and to an active key cache of the media content server, to encrypt license information with public key, the license information comprising at least one of the shared key, a URL identifier for use in accessing the encrypted media content, to sign the license information with the private key, and to communicate the license information to the browser extension of the web browser of the client device.

15. The content access device of claim 14, wherein the browser extension is configured to: validate the signature of the license server and decrypts the license information; and communicate the identifier for the encrypted media content to the browser.

16. The content access device of claim 15, wherein the browser extension is configured to: communicate with the media content server; receive a content frame of the encrypted media content encrypted with the shared key; decrypts the content frame; and render and display the content frame in the browser.

17. The content access device of claim 14, wherein the browser extension is configured to delete the shared key at the client device after the encrypted media content has been displayed.

18. The content access device of claim 14, wherein the media content server is configured to: identify the encrypted media content stored at the media server and accessible by the user based on an access privilege configuration of the user, the access privilege configuration provided by an enterprise server; and provide the identified encrypted media content to the client device.

19. The content access device of claim 18, wherein the media content server is configured to: receiving unencrypted media content at the media content server; encrypting the unencrypted media content with a set of storage keys associated with the user or a group the user is a member of; and storing the encrypted media content and associated keys in the media content server.

20. A non-transitory machine-readable storage medium comprising instructions that, when executed by one or more processors of a machine, cause the machine to perform operations comprising:

receiving, at an authentication server, authentication credentials from a browser of a client device;

authenticating a user of the client device based on the authentication credentials;

assigning an identity to the authenticated user based on a media licensing service and mapping the assigned identity to the authenticated user;

communicating, via a webservice, the identity to a key server, the key server generating a public and private key pair, a name of a certificate for the public key mapped to the identity assigned to the authenticated user;

forming, at the key server, a hash based on web session attributes of the browser of the client device, the web session attributes comprising HMTL parameters for the browser requesting a certificate;

encrypting the public and private key pair with the hash; and communicating the encrypted key pair to a browser extension of the browser of the client device, the browser extension configured to form the same hash to decrypt the encrypted key pair, to store the certificate at the client device, and to decrypt the encrypted key pair using the hash.

\* \* \* \* \*